United States Patent [19]

Takeshita et al.

[11] Patent Number: 4,820,751
[45] Date of Patent: Apr. 11, 1989

[54] RUBBER COMPOSITION FOR TIRES

[75] Inventors: Michitaka Takeshita, Koganei; Uchu Mukai, Kodaira; Toshio Sugawara, Higashiyamato, all of Japan

[73] Assignee: Bridgestone Corporation, Tokyo, Japan

[21] Appl. No.: 185,745

[22] Filed: Apr. 25, 1988

[30] Foreign Application Priority Data

Apr. 23, 1987 [JP] Japan .................................. 62-98501
Feb. 16, 1988 [JP] Japan .................................. 63-31864

[51] Int. Cl.$^4$ .......................... C08K 3/04; C08K 9/00; C08L 21/00
[52] U.S. Cl. .................................... 523/215; 523/200; 523/203; 523/213; 524/496; 524/571; 524/573
[58] Field of Search ............... 523/215, 200, 203, 213; 524/496, 571, 573

[56] References Cited

U.S. PATENT DOCUMENTS 4,721,740  1/1988  Takeshita et al. .................. 523/215

FOREIGN PATENT DOCUMENTS 287802  12/1986  Japan .
291659  12/1986  Japan .
197429   9/1987  Japan .

*Primary Examiner*—Herbert J. Lilling
*Attorney, Agent, or Firm*—Sughrue, Mion, Zinn, Macpeak and Seas

[57] ABSTRACT

A rubber composition for tires having improved heat build-up and high temperature reinforcibility comprises specified amounts of particular surface-treated carbon black, silica and particular silane coupling agent based on 100 parts by weight of rubber ingredient.

5 Claims, No Drawings

RUBBER COMPOSITION FOR TIRES

BACKGROUND OF THE INVENTION

1. Field of the Invention

This invention relates to a rubber composition for tires, and more particularly to a rubber composition for tires having improved heat build-up and high temperature reinforcibility.

2. Related Art Statement

Heretofore, various attempts for simultaneously improving the heat built-up and reinforcibility have been made in rubber compositions used in tires and other rubber articles.

For instance, Japanese Patent laid open No. 62-184,463 discloses that the dispersibility of carbon black is improved by restraining the formation of strong acidic group such as —COOH group or the like introduced into the surface of carbon black and preferentially producing —OH group through low temperature plasma treatment, whereby the resistance to heat build-up and the reinforcibility of the rubber composition can be improved.

On the other hand, Japanese Patent laid open No. 50-88,150 discloses that a given amount of at least one of active silicate filler and bis(alkoxysilylalkyl)oligosulfide is used and mixed in a mixture of natural rubber and synthetic rubber together with, if necessary, o.1~50 parts by weight of carbon black based on 100 parts by weight of rubber ingredient. Similarly, Japanese Patent laid open No. 61-287,802 discloses a technique for the provision of tires having excellent cut resistance and low heat build-up by using as a base rubber for the tire tread of cap/base structure a rubber composition containing 30~50 parts of carbon black having a specific surface area of not less than 100 mg/g as measured by iodine adsorption process, 5~30 parts of silica, 0.5~6 parts of a silane coupling agent represented by the general formula of $(OR)_3SiC_nH_{2n}S_mC_nH_{2n}Si(OR)_3$ or $(OR)_3SiC_nH_{2n}X$ (wherein R is an alkyl group, X is a mercapto group, an amino group or an epoxy group, and n and m are a positive integer, respectively) and a given amount of a softening agent based on rubber ingredient composed of natural rubber and styrene-butadiene rubber.

Furthermore, Japanese Patent laid open No. 61-291,659 discloses a modified carbon black having an improved dynamic heat stability by treating a conductive carbon black with a silicon compound in a solvent, and Japanese Patent laid open No. 62-197,429 discloses a composition for a conductive shrinkable film containing (a) 10~50 parts by weight of a conductive carbon black and (b) 0.5~5 parts by weight of an organic silane coupling agent and/or an imidazole series compound based on 100 parts by weight of polybutadiene.

However, it can be said that these conventional techniques are still insufficient from a viewpoint of simultaneous large improvements of the resistance to heat build-up and the reinforcibility aiming at the invention.

That is, the technique described in Japanese Patent laid open No. 62-18,446 is attempted to simultaneously establish the heat build-up and the reinforcibility of the rubber composition by preferentially producing —OH group on the surface of carbon black to improve the dispersibility of carbon black through low temperature plasma treatment. In this technique, however, the carbon black is insufficient in the interaction with the polymer rubber even at the active state because the surface of the carbon black is modified, and consequently when the rubber composition is used in tires used under severe service conditions, it is particularly insufficient for practical use in view of the high temperature reinforcibility.

On the other hand, the rubber composition described in Japanese Patent laid open No. 50-88,150 and No. 61-287,802 uses silica and silane coupling agent and further reinforcible carbon black, but the chemical bonding between silane coupling agent and carbon black is not sufficiently performed even when being mixed with the silane coupling agent or when modifying carbon black therewith, and consequently the bonding between rubber polymers can not sufficiently be performed through carbon black and silane. As a result, it is not practically regarded to reach to a sufficiently satisfactory level as a rubber composition for tires in view of tensile strength at high temperature and heat buildup. Therefore, these techniques have naturally a limit when they are applied to high performance tire members requiring the high temperature reinforcibility.

SUMMARY OF THE INVENTION

It is, therefore, an object of the invention to solve the aforementioned problems of the conventional techniques and to provide a rubber composition for tires having considerably improved heat build-up and high temperature reinforcibility.

The inventors have aimed at the surface activated state of carbon black in order to solve the above problems and simultaneously establish the reinforcibility and heat build-up required in the rubber composition for tires and enhance these properties to an extent of developing the practical effect and have made various studies and found that the synergistic action with the silane coupling agent is observed on the surface of the carbon black by compounding given amounts of carbon black having a proper amount of -OH group in its surface and silane coupling agent with a rubber composition to obtain a very excellent effect for practical use, and as a result the invention has been accomplished.

According to the invention, there is the provision of a rubber composition for tires, comprising a rubber ingredient selected from the group consisting of natural rubber, diene series synthetic rubber and a blend thereof, and 30~150 parts by weight of a reinforcible carbon black having a specific surface area ($N_2SA$) of 70~250 m$^2$/g as measured by nitrogen adsorption process, a dibutyl phthalate absorption (DBP absorption) of 80~150 ml/100 g, a concentration of total acidic group introduced to the surface of carbon black of 0.25~2.0 $\mu$eq/m$^2$, a ratio of weak acidic group in the total acidic group of at least 65% and a pH value of 3~5.5, 0~40 parts by weight of silica based on 100 parts by weight of said rubber ingredient, and $4.65 \times 10^{-6}$ m·s ~ $4.65 \times 10^{-3}$ m·s (m is parts by weight of carbon black added and s is a value of $N_2SA$ of carbon black) of at least one silane coupling agent selected from compounds having the following general formulae (1) and (2):

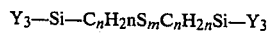

or

                                  (1)

wherein X is a nitroso group, a mercapto group, an amino group, an epoxy group, a vinyl group, a chlorine atom or an imido group, Y is an alkyl group or an alkoxyl group having a carbon number of 1~4 or a chlorine atom, and each of n and m is an integer of 1~6; and $$Y_3SiC_nH_{2n}S_mX' \qquad (2)$$

wherein X' is

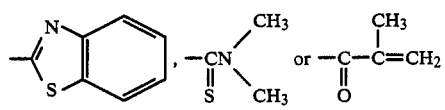

and Y, m and n are the same as described above.

DESCRIPTION OF THE PREFERRED EMBODIMENTS

As the diene series synthetic rubber used in the invention, mention may be made of synthetic isoprene rubber, styrene-butadiene rubber, butadiene rubber, butyl rubber, ethylene-propylene-diene terpolymer rubber, chloroprene rubber, nitrile rubber and the like.

The carbon black having —OH group introduced into the surface thereof is obtained by vacuum low temperature plasma treatment described, for example, in Japanese Patent laid open No. 62-184,463, by a chemical treatment using ozone or the like.

The amount of the silane coupling agent added together with the carbon black is defined by a relation to the addition amount of carbon black as mentioned above and is preferably within a range of $1.16\times10^{-4}$ m·s ~ $1.16\times10^{-3}$ m·s. If it is intended to add silica to the rubber composition according to the invention, the addition amount of the silane coupling agent is also controlled by the addition amount of silica, and in this case it is required to satisfy a relation of 0.05 m'~0.2 m' (m' is parts by weight of silica added).

Moreover, when the carbon black is used together with the silane coupling agent, the surface treated carbon black for introducing —OH group is previously subjected to a modification treatment with the silane coupling agent. In this case, there are the following two methods for modification with the silane coupling agent, i.e. ① a method wherein carbon black is mixed with a silane coupling agent while stirring in a Henschel mixer at a temperature of from room temperature to 80° C. for 5~20 minutes, and ② a method wherein the oxidized carbon is put into a methanol solution containing a silane coupling agent and then mixed with stirring at a temperature of from room temperature to 80° C. for 5~20 minutes.

Of course, the rubber composition according to the invention may contain a proper amount of a vulcanizing agent such as sulfur, a vulcanization accelerator, an antioxidant, a softening agent, a filler or the like.

Moreover, the measurement of $N_2SA$ was carried out according to a method of ASTM D3037 and the measurement of DBP absorption was carried out according to a method of ASTM D3493.

In the rubber composition according to the invention, the reinforcible carbon black is required to have $N_2SA$ of 70~250 $m^2/g$ and DBP absorption of 80~150 ml/100 g. When the values of $N_2SA$ and DBP absorption are less than their lower limits, the effect of improving the dispersibility is small, while when they exceed the upper limits, the dispersibility is poor and the heat build-up undesirably increases.

Furthermore, the carbon black defined in the invention has a concentration of total acidic group introduced into the surface of the carbon black of 0.25~2.0 $\mu eq/m^2$ and a ratio of weak acidic group in total acidic group of at least 65%. When the concentration of total acidic group is less than the lower limit, the tensile strength at high temperature lowers, while when it exceeds the upper limit, the elongation at break lowers to degrade the rupture properties. Preferably, the concentration of total acidic group is within a range of 0.3~0.8 $\mu eq/m^2$. Moreover, the pH value through the introduction of —OH group is within a range of 3~5.5. When the pH value is less than 3, the vulcanization is undesirably delayed, while when it exceeds 5.5, the number —OH group reduces and the object of the invention can not be achieved.

The addition amount of the carbon black having properties as mentioned above is within a range of 30~150 parts by weight based on 100 parts by weight of the rubber ingredient. When the addition amount is less than 30 parts by weight, the reinforcing effect to the rubber composition is insufficient, while when it exceeds 150 parts by weight, the dispersibility to rubber undesirably degrades. Preferably, the addition amount of carbon black is within a range of 40~100 parts by weight. Furthermore, when silica is used together with the carbon black, the amount of silica added is limited to 40 parts by weight because when its exceeds 40 parts by weight, the wear resistance and rupture properties at high temperature undesirably degrade. Moreover, the effect of the invention is developed even if silica is not added.

The amount of the silane coupling agent added in the rubber composition according to the invention is defined by the addition amount of carbon black and, if necessary, by the addition amount of silica as mentioned above. When the addition amount of the silane coupling agent is less than $4.65\times10^{-5}$ m·s, the coupling effect is very small and the improving effect of heat build-up is not observed, while when it exceeds $4.65\times10^{-3}$ m·s, the reinforcibility undesirably lowers.

The compounding of the carbon black having -OH group in its surface and the silane coupling agent into the rubber composition has never been known from the conventional techniques and is first performed in the invention. According to the invention, the considerably improving effect of the reinforcibility and heat buildup is based on the fact that the chemically strong primary bonding is formed between the active carbon black having an improved dispersibility by the treatment for introduction of —OH group and the silane coupling agent and further this silane coupling agent interacts with rubber polymer to wholly form a strong bond among carbon black - silane coupling agent - rubber polymer even at high temperature.

The following examples are given in illustration of the invention and are not intended as limitations thereof.

At first, the tests for properties of various rubber compositions prepared by using carbon black treated through vacuum low temperature plasma process will be described below.

Vacuum low temperature plasma process

Into a flask-type plasma chamber of 500 ml made from a Pyrex glass was charged 50 g of carbon black, which was subjected to vacuum low temperature plasma process while being rotated at a speed of at least 5 rpm for uniformizing the treatment and suppressing the incineration.

The vacuum low temperature plasma process was carried out by using a treating gas as shown in the following Table 1 for a treating time shown in Table 1 under conditions that the output at high frequency (13.56 MHz) was 25 W, and the vacuum degree was 0.3 Torr and the flow rate of the treating gas was 50 ml/min.

The concentration of —OH group introduced into the surface of carbon black by the above treatment and pH value were measured as follows:

Measurement of —OH group concentration

The concentration of —OH group on the surface of carbon black was determined by neutralizing the surface —OH group with sodium hydrogen carbonate and sodium hydroxide according to a Boehm's method (Angew. Chem. internat. Edit., 5, 533 (1966) and 3, 669 (1964)).

Measurement of pH value 1 g of a sample was added to 100 ml of ion exchanged water, boiled for 15 minutes, left to stand for 48 hours and then stirred by means of a stirrer, during which a pH value of the resulting suspension was measured by means of a pH meter.

The measured results on the surface —OH group concentration and pH value are also shown in Table 1.

TABLE 1

| Kind of carbon | Treating conditions Treating gas | Treating time (hour) | —OH group (/m$^2$) | pH value | Presence or absence of modification with silane coupling agent | Remarks |
|---|---|---|---|---|---|---|
| HAF carbon black A*1 | — | — | $9.3 \times 10^{11}$ | 7.1 | absence | reference |
| HAF carbon black B | O$_2$/air = 50/50 | 6 | $1.0 \times 10^{12}$ | 2.6 | absence | carbon black |
| HAF carbon black C | air | 0.5 | $4.3 \times 10^{12}$ | 4.8 | absence | carbon black |
| HAF carbon black D | air | 1.0 | $1.1 \times 10^{13}$ | 4.2 | absence | according to |
| HAF carbon black E | air | 2.0 | $1.5 \times 10^{13}$ | 3.4 | absence | the invention |
| ISAF carbon black F*2 | air | 1.0 | $1.3 \times 10^{13}$ | 4.0 | absence | |
| HAF carbon black G | air | 1.0 | $3.6 \times 10^{12}$ | 4.4 | presence*3 | |

*1non-treated HAF carbon black had N$_2$SA:88 m$^2$g, IA:80 mg/g, DBP:103 ml/100 g
*2non-treated ISAF carbon black had N$_2$SA:116 m$^2$/g, IA:120 mg/g, DBP:115 ml/100 g
*3silane coupling agent used: 3-trimethoxysilylpropyl-N,N—dimethylthiocarbamoyltetrasulfide (b in Table 2), modified amount: 2% (weight) to carbon black, reaction modification Each of the thus treated carbon blacks shown in Table 1 was compounded together with a silane coupling agent as shown in the following Table 2 with rubber ingredient and the like according to a compounding recipe (part by weight) shown in the following Table 3 to prepare a rubber composition to be tested.

The tensile strength, modulus and tan δ as a heat build-up were measured with respect to these test rubber compositions as follows:

Tensile strength

It was measured at 100° C. according to a method of JIS K6301.

Modulus

The tensile stress at 300% elongation was measured at 100° C. according to a method of JIS K6301.

tan δ

It was measured at 30° C. under a dynamic shearing strain amplitude of 1.0% and an oscillation of 1.0 Hz by means of a mechanical spectrometer made by Rheometrix Co. The smaller the measured value, the better the dispersibility.

The measured results on the tensile strength, modulus and tan δ are also shown in Table 3.

TABLE 2

| Kind of silane coupling agent | Chemical name | Structural formula |
|---|---|---|
| a | bis-(3-triethoxysilylpropyl)-tetrasulfide | $[(C_2H_5O)_3SiC_3H_6]_2S_4$ |
| b | 3-trimethoxysilylpropyl-N,N—dimethylthiocarbamoyl-tetrasulfide | $(CH_3O)_3SiC_3H_6S_4CN(CH_3)_2$ with C=S |
| c | trimethoxysilylpropyl-mercaptobenzothiazole-tetrasulfide | $(CH_3O)_3SiC_3H_6S_4$-(benzothiazole) |
| d | triethoxysilylpropyl-methacrylate-monosulfide | $(C_2H_5O)_3SiC_3H_6SC(=O)C(CH_3)=CH_2$ |

TABLE 2-continued

| Kind of silane coupling agent | Chemical name | Structural formula |
|---|---|---|
| e | dimethoxymethylsilylpropyl-N,N—dimethylthiocarbamoyl-tetrasulfide | $(CH_3O)_2\underset{\underset{CH_3}{\mid}}{Si}C_3H_6S_4C\underset{\underset{S}{\parallel}}{N}\diagdown\overset{CH_3}{\diagup}CH_3$ |

TABLE 3

| | Comparative Example 1 | Comparative Example 2 | Comparative Example 3 | Comparative Example 4 | Example 1 | Example 2 |
|---|---|---|---|---|---|---|
| natural rubber | 100 | 100 | 100 | 100 | 100 | 100 |
| isoprene rubber | — | — | — | — | — | — |
| styrene-butadiene rubber | — | — | — | — | — | — |
| HAF carbon black A | 50 | 50 | — | — | — | — |
| HAF carbon black B | — | — | 50 | — | — | — |
| HAF carbon black C | — | — | — | 50 | 50 | — |
| HAF carbon black D | — | — | — | — | — | 50 |
| HAF carbon black E | — | — | — | — | — | — |
| ISAF carbon black F | — | — | — | — | — | — |
| HAF carbon black G | — | — | — | — | — | — |
| stearic acid | 2.0 | 2.0 | 2.0 | 2.0 | 2.0 | 2.0 |
| Nipsil AQ* | — | — | — | — | — | — |
| kind of silane coupling agent (amount) | — | b(1.0) | b(1.0) | — | b(1.0) | b(1.0) |
| ZnO | 4.0 | 4.0 | 4.0 | 4.0 | 4.0 | 4.0 |
| sulfur | 1.5 | 1.5 | 1.5 | 1.5 | 1.5 | 1.5 |
| amine series antioxidant | 1.0 | 1.0 | 1.0 | 1.0 | 1.0 | 1.0 |
| cyclohexylbenzothiazole sulfeneamide | 1.0 | 1.0 | 1.0 | 1.0 | 1.0 | 1.0 |
| dibenzothiazyldisulfide | — | — | — | — | — | — |
| Rubber properties | | | | | | |
| Tensile strength at 100° C. (kgf/cm$^2$) | 168 | 170 | 143 | 147 | 184 | 196 |
| Heat build-up (tan δ) | 0.123 | 0.125 | 0.095 | 0.084 | 0.069 | 0.064 |
| Modulus at 100° C. (kgf/cm$^2$) | 27 | 30 | 28 | 24 | 32 | 37 |

| | Example 3 | Comparative Example 5 | Example 4 | Comparative Example 6 | Example 5 | Example 6 |
|---|---|---|---|---|---|---|
| natural rubber | 100 | 80 | 80 | — | — | — |
| isoprene rubber | — | 20 | 20 | — | — | — |
| styrene-butadiene rubber | — | — | — | 100 | 100 | 100 |
| HAF carbon black A | — | — | — | — | — | — |
| HAF carbon black B | — | — | — | — | — | — |
| HAF carbon black C | — | — | — | 55 | 55 | 55 |
| HAF carbon black D | — | — | — | — | — | — |
| HAF carbon black E | 50 | — | — | — | — | — |
| ISAF carbon black F | — | 60 | 60 | — | — | — |
| HAF carbon black G | — | — | — | — | — | — |
| stearic acid | 2.0 | 2.0 | 2.0 | 2.0 | 2.0 | 2.0 |
| Nipsil AQ* | — | — | — | — | — | — |
| kind of silane coupling agent (amount) | c(1.0) | — | d(1.0) | — | a(1.0) | a(8.0) |
| ZnO | 4.0 | 4.0 | 4.0 | 4.0 | 4.0 | 4.0 |
| sulfur | 1.5 | 1.5 | 1.5 | 1.5 | 1.5 | 1.5 |
| amine series antioxidant | 1.0 | 1.0 | 1.0 | 1.0 | 1.0 | 1.0 |
| cyclohexylbenzothiazole sulfeneamide | 1.0 | 1.0 | 1.0 | — | — | — |
| dibenzothiazyldisulfide | — | — | — | 1.0 | 1.0 | 1.0 |
| Rubber properties | | | | | | |
| Tensile strength at 100° C. (kgf/cm$^2$) | 182 | 142 | 188 | 86 | 121 | 115 |
| Heat build-up (tan δ) | 0.059 | 0.137 | 0.131 | 0.175 | 0.159 | 0.143 |
| Modulus at 100° C. (kgf/cm$^2$) | 41 | 32 | 45 | 34 | 40 | 44 |

| | Example 7 | Example 8 | Comparative Example 7 | Comparative Example 8 | Example 9 |
|---|---|---|---|---|---|
| natural rubber | — | 100 | 100 | 100 | 100 |
| isoprene rubber | — | — | — | — | — |
| styrene-butadiene rubber | 100 | — | — | — | — |
| HAF carbon black A | — | — | — | 30 | — |
| HAF carbon black B | — | — | — | — | — |
| HAF carbon black C | — | — | 50 | — | — |
| HAF carbon black D | 55 | — | — | — | — |
| HAF carbon black E | — | — | — | — | 30 |
| ISAF carbon black F | — | — | — | — | — |
| HAF carbon black G | — | — | — | — | — |
| stearic acid | 2.0 | 2.0 | 2.0 | 2.0 | 2.0 |
| Nipsil AQ* | — | — | — | 25 | 25 |
| kind of silane coupling agent (amount) | e(1.0) | — | b(25) | b(3.0) | b(3.0) |
| ZnO | 4.0 | 4.0 | 4.0 | 4.0 | 4.0 |
| sulfur | 1.5 | 1.5 | 1.5 | 1.5 | 1.5 |
| amine series antioxidant | 1.0 | 1.0 | 1.0 | 1.0 | 1.0 |
| cyclohexylbenzothiazole sulfeneamide | — | 1.0 | 1.0 | 1.0 | 1.0 |
| dibenzothiazyldisulfide | 1.0 | 1.0 | — | — | — |

TABLE 3-continued

| Rubber properties | | | | | |
|---|---|---|---|---|---|
| Tensile strength at 100° C. (kgf/cm²) | 112 | 196 | 133 | 145 | 189 |
| Heat build-up (tan δ) | 0.143 | 0.073 | 0.061 | 0.075 | 0.063 |
| Modulus at 100° C. (kgf/cm²) | 39 | 40 | 63 | 26 | 35 |

*silica made by Nippon Silica K.K.

Then, the property test as mentioned above was made by using carbon black subjected to oxidation treatment as mentioned later.

Oxidation treatment of carbon black 1

100 g of carbon black of ISAF grade (Asahi #80, trade name, made by Asahi Carbon K.K.; nitrogen adsorption specific surface area 117 m²/g, DBP absorption 115 ml/100 g) (ISAF carbon black A in Table 4) was added to 1 l of an aqueous solution of 2 g of hydrogen peroxide and reacted by heating at 60°-70° C. for 30 minutes with stirring. After the completion of the reaction, the resulting carbon black suspension was filtered and dried in a dryer at 120° C. for 12 hours to produce the oxidized carbon black (ISAF carbon black C). This oxidized carbon black had a total acidic group of 0.34 μeq/m², a weak acidic group of 0.28 μeq/m² and a ratio of weak acidic group of 82%.

The same procedure as mentioned above was repeated by varying the amount of hydrogen peroxide into 0.1 g, 5.0 g, 20.0 g or 30.0 g to produce carbon blacks having different oxidation states (ISAF carbon blacks B, D~F).

Furthermore, carbon black of HAF grade (HAF carbon black J) was subjected to the same procedure as mentioned above using 5.0 g of hydrogen peroxide to thereby produce the oxidized HAF carbon black (HAF carbon black K).

Oxidation treatment of carbon black 2

The same carbon black as in the oxidation treatment 1 was treated with a 1% aqueous solution of nitric acid instead of hydrogen peroxide (ISAF carbon black G).

Oxidation treatment of carbon black 3

Air containing ozone generated from an ozone generating device was passed in 100 g of the same carbon black as in the oxidation treatment 1 at a flow rate of 5 l/min for 30 minutes to produce the oxidized carbon black (ISAF carbon black H). In this case, the amount of ozone generated from the ozone generating device was 3.6 g/hr when using air.

The test for the properties of the above carbon black was performed under the following conditions.

Quantification of total acidic group 1 g of carbon black was accurately weighed and added with 50 ml of 1/250 normal solution of sodium hydroxide, which was boiled in a flask provided with a reflux condenser at 100° C. for 2 hours. Then, 10 ml of the resulting supernatant liquid was titrated with 1/500 normal hydrochloric acid and at the same time, the blank test was performed. The total acidic group ($\mu$eq/g) was determined from the difference between the values of both tests, from which the total acidic group per unit area ($\mu$eq/m²) was calculated with the previously measured nitrogen adsorption specific surface area ($N_2SA$) of the test carbon black.

Quantification of weak acidic group

The amount of weak acidic group was calculated from the following equation:

amount of weak acidic group ($\mu$eq/m²)=amount of total acidic group ($\mu$eq/m²)−amount of strong acidic group ($\mu$eq/m²)

Quantification of strong acidic group 2 g of carbon black was accurately weighed and added with 100 ml of a 1/50 normal solution of sodium hydrogen carbonate, which was shaked at room temperature for 4 hours. Then, 20 ml of the resulting supernatant liquid was added with 21 ml of 1/50 normal hydrochloric acid and boiled for 15 minutes, and thereafter the excessive amount of hydrochloric acid was titrated with 1/500 normal sodium hydroxide while performing the blank test. The amount of strong acidic group ($\mu$eq/g) was determined from the difference between both tests, from which the amount of strong acidic group per unit area ($\mu$eq/m²) was calculated with the previously measured nitrogen adsorption specific surface area ($N_2SA$) of the test carbon black.

Nitrogen adsorption specific surface area ($N_2SA$)

It was measured according to a method of ASTM D3037-78.

pH value

It was measured according to a method of ASTM D1512-75.

Volatile matter

It was measured according to a method of JIS K6221. The thus obtained results are shown in Table 4.

TABLE 4

| Kind of carbon black | Treating solution | Amount of $H_2O_2$ to 100 g of carbon black (g) | $NH_2SA$ m²/g | pH | Volatile matter | Amount of total acidic group ($\mu$eq/m²) | Amount of weak acidic group ($\mu$eq/m²) | Modification with silane coupling agent | Remarks |
|---|---|---|---|---|---|---|---|---|---|
| ISAF carbon black A | — | — | 117 | 6.5 | 1.22 | 0.26 | 0.23 | absence | reference carbon black |
| ISAF carbon black B | aqueous $H_2O_2$ solution | 0.1 | 117 | 6.5 | 1.22 | 0.27 | 0.23 | absence | |
| ISAF carbon black C | aqueous $H_2O_2$ solution | 2.0 | 117 | 5.4 | 1.31 | 0.34 | 0.28 | absence | carbon black according to the invention |
| ISAF carbon black D | aqueous $H_2O_2$ solution | 5.0 | 117 | 4.8 | 1.52 | 0.42 | 0.31 | absence | |
| ISAF carbon | aqueous $H_2O_2$ | 20.0 | 118 | 3.6 | 2.41 | 0.75 | 0.47 | absence | |

TABLE 4-continued

| Kind of carbon black | Treating solution | Amount of $H_2O_2$ to 100 g of carbon black (g) | $NH_2SA$ $m^2/g$ | pH | Volatile matter | Amount of total acidic group ($\mu eq/m^2$) | Amount of weak acidic group ($\mu eq/m^2$) | Modification with silane coupling agent | Remarks |
|---|---|---|---|---|---|---|---|---|---|
| black E | solution | | | | | | | | |
| ISAF carbon black F | aqueous $H_2O_2$ solution | 30.0 | 119 | 2.8 | 2.93 | 0.84 | 0.56 | absence | reference carbon black |
| ISAF carbon black G | aqueous $HNO_3$ solution | 1.0 | 117 | 5.4 | 1.26 | 0.35 | 0.29 | absence | carbon black according to the invention |
| ISAF carbon black H | $O_3$ gas | *1 | 117 | 4.7 | 1.54 | 0.45 | 0.33 | absence | |
| ISAF carbon black I | aqueous $H_2O_2$ solution | 5.0 | 117 | 4.8 | 1.52 | 0.42 | 0.31 | presence*2 | |
| HAF carbon black J | — | — | 90 | 6.5 | 1.28 | 0.29 | 0.25 | absence | reference carbon black |
| HAF carbon black K | aqueous $H_2O_2$ solution | 5.0 | 90 | 4.5 | 1.90 | 0.52 | 0.37 | absence | carbon black according to the invention |

*1 Details of $O_3$ treatment was previously mentioned.
*2 silane coupling agent used: 3-trimethoxysilylpropyl-N,N—dimethylthiocarbamoyltetrasulfide (b in Table 2), modified amount: 2% (weight) to carbon black, reaction modification Each of the above carbon blacks shown in Table 4 was compounded together with the silane coupling agent shown in Table 2 with rubber ingredient and the like according to a compounding recipe (part by weight) as shown in Table 5 to prepare a rubber composition to be tested. The vulcanization conditions were 145° C. and 30 minutes.

The tensile strength, modulus, wear resistance and tan δ were evaluated with respect to these test rubber compositions.

Wear resistance

The amount of wear loss was measured by means of a Lambourn abrasion tester, from which an index of wear resistance was calculated by the following equation:

wear resistance index=(amount of volume loss in test specimen of Comparative Example 9/amount of volume loss in test specimen)×100.

The larger the index value, the better the wear resistance.

tan δ

It was measured at 25° C. under a dynamic shearing strain amplitude of 1.0% and a frequency of 50 Hz by means of a dynamic viscoelasticity measuring meter (VES-S type viscoelastic spectrometer, made by Iwamoto Seisakusho). The smaller the value, the more the heat build-up is improved.

Rebound resilience

It was measured according to a method of JIS K6300-974.

The measured results are also shown in Table 5.

TABLE 5

| | Comparative Example 9 | Comparative Example 10 | Comparative Example 11 | Example 11 | Comparative Example 12 | Example 12 |
|---|---|---|---|---|---|---|
| natural rubber | 100 | 100 | 100 | 100 | 100 | 100 |
| isoprene rubber | — | — | — | — | — | — |
| styrene-butadiene rubber | — | — | — | — | — | — |
| ISAF carbon black A | 50 | 50 | — | — | — | — |
| ISAF carbon black B | — | — | 50 | — | — | — |
| ISAF carbon black C | — | — | — | 50 | 50 | — |
| ISAF carbon black D | — | — | — | — | — | 50 |
| ISAF carbon black E | — | — | — | — | — | — |
| ISAF carbon black F | — | — | — | — | — | — |
| ISAF carbon black G | — | — | — | — | — | — |
| ISAF carbon black H | — | — | — | — | — | — |
| ISAF carbon black I | — | — | — | — | — | — |
| HAF carbon black J | — | — | — | — | — | — |
| HAF carbon black K | — | — | — | — | — | — |
| stearic acid | 2.0 | 2.0 | 2.0 | 2.0 | 2.0 | 2.0 |
| Nipsil AQ | — | — | — | — | — | — |
| kind of silane coupling agent (amount) | — | b(1.0) | b(1.0) | b(1.0) | — | b(1.0) |
| ZnO | 4.0 | 4.0 | 4.0 | 4.0 | 4.0 | 4.0 |
| sulfur | 1.5 | 1.5 | 1.5 | 1.5 | 1.5 | 1.5 |
| amine series antioxidant | 1.0 | 1.0 | 1.0 | 1.0 | 1.0 | 1.0 |
| N—oxydiethylene-2-benzothiazylsulfeneamide | 1.0 | 1.0 | 1.0 | 1.0 | 1.0 | 1.0 |
| Rubber properties | | | | | | |
| Tensile strength at 100° C. (kgf/cm$^2$) | 150 | 158 | 158 | 174 | 160 | 186 |
| 300% modulus at 100° C. (kgf/cm$^2$) | 95 | 102 | 96 | 97 | 90 | 97 |
| Index of wear resistance | 100 | 100 | 100 | 100 | 93 | 104 |
| Heat build-up (tan δ) | 0.207 | 0.203 | 0.202 | 0.180 | 0.180 | 0.169 |
| rebound resilience (%) | 56 | 56 | 57 | 60 | 60 | 62 |
| | Example 13 | Comparative Example 13 | Example 14 | Example 15 | Example 16 | Comparative Example 14 |

TABLE 5-continued

| | | | | | | |
|---|---|---|---|---|---|---|
| natural rubber | 100 | 100 | 100 | 100 | 100 | 100 |
| isoprene rubber | — | — | — | — | — | — |
| styrene-butadiene rubber | — | — | — | — | — | — |
| ISAF carbon black A | — | — | — | — | — | — |
| ISAF carbon black B | — | — | — | — | — | — |
| ISAF carbon black C | — | — | — | — | — | — |
| ISAF carbon black D | — | — | — | — | — | — |
| ISAF carbon black E | 50 | — | — | — | — | — |
| ISAF carbon black F | — | 50 | — | — | — | — |
| ISAF carbon black G | — | — | 50 | — | — | — |
| ISAF carbon black H | — | — | — | 50 | — | — |
| ISAF carbon black I | — | — | — | — | — | — |
| HAF carbon black J | — | — | — | — | — | — |
| HAF carbon black K | — | — | — | — | — | 50 |
| stearic acid | 2.0 | 2.0 | 2.0 | 2.0 | 2.0 | 2.0 |
| Nipsil AQ | — | — | — | — | — | — |
| kind of silane coupling agent (amount) | b(1.0) | b(1.0) | b(1.0) | b(1.0) | b(1.0) | — |
| ZnO | 4.0 | 4.0 | 4.0 | 4.0 | 4.0 | 4.0 |
| sulfur | 1.5 | 1.5 | 1.5 | 1.5 | 1.5 | 1.5 |
| amine series antioxidant | 1.0 | 1.0 | 1.0 | 1.0 | 1.0 | 1.0 |
| N—oxydiethylene-2-benzothiazylsulfeneamide | 1.0 | 1.0 | 1.0 | 1.0 | 1.0 | 1.0 |
| Rubber properties | | | | | | |
| Tensile strength at 100° C. (kgf/cm$^2$) | 181 | 165 | 177 | 184 | 180 | 200 |
| 300% modulus at 100° C. (kgf/cm$^2$) | 96 | 92 | 95 | 96 | 96 | 110 |
| Index of wear resistance | 102 | 90 | 100 | 101 | 104 | 88 |
| Heat build-up (tan δ) | 0.172 | 0.180 | 0.185 | 0.170 | 0.169 | 0.185 |
| rebound resilience (%) 62 | 60 | 59 | 62 | 62 | 59 | |

| | Example 17 | Comparative Example 15 | Example 18 | Comparative Example 16 | Example 19 | Example 20 |
|---|---|---|---|---|---|---|
| natural rubber | 100 | 80 | 80 | — | — | — |
| isoprene rubber | — | 20 | 20 | — | — | — |
| styrene-butadiene | — | — | — | — | — | 100 |
| ISAF carbon black A | — | — | — | 100 | 100 | — |
| ISAF carbon black B | — | — | — | 60 | — | — |
| ISAF carbon black C | — | — | — | — | — | — |
| ISAF carbon black D | — | — | — | — | — | — |
| ISAF carbon black E | — | 60 | 60 | — | 60 | 50 |
| ISAF carbon black F | — | — | — | — | — | — |
| ISAF carbon black G | — | — | — | — | — | — |
| ISAF carbon black H | — | — | — | — | — | — |
| ISAF carbon black I | — | — | — | — | — | — |
| HAF carbon black J | — | — | — | — | — | — |
| HAF carbon black K | 50 | — | — | — | — | — |
| stearic acid | 2.0 | 2.0 | 2.0 | 2.0 | 2.0 | 2.0 |
| Nipsil AQ | — | — | — | — | — | — |
| kind of silane coupling agent (amount) | a(1.0) | — | c(1.0) | — | d(1.0) | e(0.1) |
| ZnO | 4.0 | 4.0 | 4.0 | 4.0 | 4.0 | 4.0 |
| sulfur | 1.5 | 1.5 | 1.5 | 1.5 | 1.5 | 1.5 |
| amine series antioxidant | 1.0 | 1.0 | 1.0 | 1.0 | 1.0 | 1.0 |
| N—oxydiethylene-2-benzothiazylsulfeneamide | 1.0 | 1.0 | 1.0 | 1.0 | 1.0 | 1.0 |
| Rubber properties | | | | | | |
| Tensile strength at 100° C. (kgf/cm$^2$) | 223 | 151 | 182 | 70 | 88.5 | 160 |
| 300% modulus at 100° C. (kgf/cm$^2$) | 110 | 90 | 96 | 68 | 80 | 91 |
| Index of wear resistance | 90 | 90 | 99 | 60 | 62 | 94 |
| Heat build-up (tan δ) | 0.153 | 0.180 | 0.166 | 0.258 | 0.220 | 0.180 |
| rebound resilience (%) | 65 | 60 | 63 | 37 | 52 | 60 |

| | Example 21 | Example 22 | Example 23 | Comparative Example 17 | Example 24 |
|---|---|---|---|---|---|
| natural rubber | — | — | — | 100 | 100 |
| isoprene rubber | 100 | 100 | 100 | — | — |
| styrene-butadiene rubber | — | — | — | — | — |
| ISAF carbon black A | — | — | — | 30 | — |
| ISAF carbon black B | — | — | — | — | — |
| ISAF carbon black C | — | — | — | — | — |
| ISAF carbon black D | 50 | 50 | 50 | — | 30 |
| ISAF carbon black E | — | — | — | — | — |
| ISAF carbon black F | — | — | — | — | — |
| ISAF carbon black G | — | — | — | — | — |
| ISAF carbon black H | — | — | — | — | — |
| ISAF carbon black I | — | — | — | — | — |
| HAF carbon black J | — | — | — | — | — |
| HAF carbon black K | — | — | — | — | — |
| stearic acid | 2.0 | 2.0 | 2.0 | 2.0 | 2.0 |
| Nipsil AQ | — | — | — | 20 | 20 |
| kind of silane coupling agent (amount) | e(1.0) | e(5.0) | e(20) | b(3.0) | b(3.0) |
| ZnO | 4.0 | 4.0 | 4.0 | 4.0 | 4.0 |
| sulfur | 1.5 | 1.5 | 1.5 | 1.5 | 1.5 |
| amine series antioxidant | 1.0 | 1.0 | 1.0 | 1.0 | 1.0 |
| N—oxydiethylene-2-benzothiazylsulfeneamide | 1.0 | 1.0 | 1.0 | 1.0 | 1.0 |
| Rubber properties | | | | | |

TABLE 5-continued

| | | | | | |
|---|---|---|---|---|---|
| Tensile strength at 100° C. (kgf/cm$^2$) | 180 | 181 | 165 | 170 | 190 |
| 300% modulus at 100° C. (kgf/cm$^2$) | 97 | 104 | 118 | 100 | 96 |
| Index of wear resistance | 99 | 98 | 90 | 100 | 102 |
| Heat build-up (tan δ) | 0.165 | 0.150 | 0.130 | 0.180 | 0.165 |
| rebound resilience (%) | 63 | 65 | 68 | 60 | 63 |

As seen from the results of Tables 3 and 6, in the rubber compositions according to the invention containing the —OH group introduced carbon black and the silane coupling agent, the reinforcibility at high temperature and the heat build-up at room temperature (tan δ) are simultaneously improved for all of diene series rubbers, and particularly the tensile strength at high temperature is further improved by 30~40% and tan δ is further improved by 10~20%, which are an unexpected effect as compared with the conventional technique. It is proved that this unexpected effect is developed by the synergistic action of a combination of the modified carbon black and the given amount of silane coupling agent.

What is claimed is:

1. A rubber composition for tires, comprising a rubber ingredient selected from the group consisting of natural rubber, diene series synthetic rubber and a blend thereof, and 30~150 parts by weight of a reinforcible carbon black having a specific surface area (N$_2$SA) of 70~250 m$^2$/g as measured by nitrogen adsorption process, a dibutyl phthalate absorption (DBP absorption) of 80~150 ml/100 g, a concentration of total acidic group introduced into the surface of carbon black of 0.25~2.0 μeq/m$^2$, a ratio of weak acidic group in the total acidic group of at least 65% and a pH value of 3~5.5, 0~40 parts by weight of silica based on 100 parts by weight of said rubber ingredient, and 4.65×10$^{-5}$ m·s~4.65×10$^{-3}$ m·s (m is parts by weight of carbon black added and s is a value of N$_2$SA of carbon black) of at least one silane coupling agent selected from compounds having the following general formulae (1) and (2):

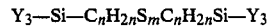

or $$Y_3\text{---}SiC_nH_{2n}X \quad (1)$$

wherein X is a nitroso group, a mercapto group, an amino group, an epoxy group, a vinyl group, a chlorine atom or an imido group, Y is an alkyl group or an alkoxyl group having a carbon number of 1~4 or a chlorine atom, and each of n and m is an integer of 1~6; and $$Y_3SiC_nH_{2n}S_mS' \quad (2)$$

wherein X' is

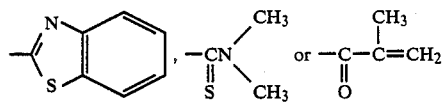

and Y, m and n are the same as described above.

2. The rubber composition according to claim 1, wherein an amount of said silane coupling agent is within a range of 1.16×10$^{-4}$ m·s~1.16×10$^{-3}$ m·s.

3. The rubber composition according to claim 1, wherein an amount of said carbon black is within a range of 40~100 parts by weight.

4. The rubber composition according to claim 1, wherein said diene series rubber is selected from synthetic isoprene rubber, styrene-butadiene rubber, butadiene rubber, butyl rubber, ethylene-propylene-diene terpolymer rubber, chloroprene rubber and nitrile rubber.

5. The rubber composition according to claim 1, wherein said concentration of total acidic group is 0.3~0.8 μeq/m$^2$.

* * * * *